(12) United States Patent
Stephenson

(10) Patent No.: US 8,099,734 B2
(45) Date of Patent: Jan. 17, 2012

(54) PORTABLE SYSTEM AND METHOD FOR SOFT RESET OF COMPUTER DEVICES

(75) Inventor: Kenneth J. Stephenson, San Clemente, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1167 days.

(21) Appl. No.: 11/851,126

(22) Filed: Sep. 6, 2007

(65) Prior Publication Data

US 2009/0070788 A1 Mar. 12, 2009

(51) Int. Cl.
*G06F 3/00* (2006.01)
*G06F 9/00* (2006.01)

(52) U.S. Cl. .................. 719/310; 713/1; 713/2
(58) Field of Classification Search .......... 719/310; 713/1, 2
See application file for complete search history.

(56) References Cited

U.S. PATENT DOCUMENTS

| 5,276,849 A * | 1/1994 | Patel ........................... 711/141 |
| 5,317,752 A * | 5/1994 | Jewett et al. .................... 714/14 |
| 6,402,038 B1 * | 6/2002 | Stanford et al. ............... 235/492 |
| 2006/0277420 A1* | 12/2006 | Nguyen ........................ 713/300 |
| 2008/0005472 A1* | 1/2008 | Khalidi et al. ................ 711/115 |

OTHER PUBLICATIONS

Naren M.Shah, Power Management and Distribution System for a More-electric Aircraft(Madmel)-Program Status, 1996.*

* cited by examiner

*Primary Examiner* — Lechi Truong
(74) *Attorney, Agent, or Firm* — SoCal IP Law Group LLP; Steven C. Sereboff; Jonathan Pearce

(57) ABSTRACT

The subject application is directed to a portable system and method for soft reset of computer devices. Upon detection of a portable data device via an associated media interface, data communication is commenced between a computer device and the detected portable data device via the media interface. A system cycle instruction is then isolated according to the data communication between the computer device and the detected data device. A system cycle is then commenced with respect to the computer device, in accordance with the isolated system cycle instruction.

14 Claims, 7 Drawing Sheets

PORTABLE SYSTEM AND METHOD FOR SOFT RESET OF COMPUTER DEVICES

BACKGROUND OF THE INVENTION

The subject application is directed generally to controlled resetting of computer systems, and is particularly applicable to controlled resets of systems wherein the dominant user interface is accomplished via touch screens. It is to be appreciated, however, that the subject application is applicable to any computer system in which selected, controlled shutdown or restart is advantageously accomplished with a portable device.

Many data processing devices employ touch screens as a dominant user interface. Applications include public or shared devices, as with walk-up or drive up terminals, such as kiosks. Such devices are typically made to be inexpensive, easy to use, and reasonably secure from tampering or unintended uses. Systems will therefore frequently employ a computer system, and a touch screen interface, thus eliminating a necessity of having a separate key-based data input mechanism.

Unfortunately, any computer device may be subject to one or more failure modes, attributed to software problems, hardware problems, data errors, or any combination thereof. Most private computer systems, such as workstations or personal computers, employ a cycling system that initiates a graceful shut down, which may be followed by a system restart. Such cycling is often accomplished with a keystroke combination, such as the ubiquitous control-alt-delete combination employed in many Microsoft software products. Such key combinations may either immediately initiate a system cycling, or may alternatively initiate a supervisory application that allows for selected cycling of a system or termination of an errant application.

Systems, such as the afore-noted kiosks, often avoid key-based input, thus precluding options for addressing failures such as the types noted above. A system lockup will frequently result in a disabling of a touch screen interface. While it may be possible to transport a keyboard and connect it to a computer to address a problem, this is a cumbersome and time consuming process. This is particularly problematic when many devices must be maintained simultaneously, such as in a document processing facility employing printing, facsimile, electronic mail, copying, or other document processing operations via a group of publicly accessible kiosks. It may be possible to force a hardware reset or physically remove and reapply power to a system, but such extreme tactics may result in lost data that existed in volatile memory during the reset, or may also result in corruption of software

SUMMARY OF THE INVENTION

In accordance with one embodiment of the subject application, there is provided a system and method for controlled shutdown or restart of computer systems.

Further, in accordance with one embodiment of the subject application, there is provided a system and method for the controlled shutdown or restart of computer systems wherein the dominant user interface is a touch screen.

Still further, in accordance with one embodiment of the subject application, there is provided a portable system for soft reset of computers. The system includes a media interface comprising means adapted for detecting a presence of a portable data device, and means adapted for commencing data communication between a computer device and a detected portable data device. The system also includes system cycle instruction isolation means adapted for isolating a system cycle instruction in accordance with data communication between the computer device and a detected portable data device and means adapted for commencing a system cycle of the computer device in accordance with an isolated system cycle instruction.

In one embodiment of the subject application, the system cycle instruction includes a power down instruction initiating a soft shutdown of the computer device. Preferably, the system cycle instruction further includes a restart instruction so as to initiate a restart of the computer device after soft shutdown thereof.

In another embodiment of the subject application, the portable data device includes a non-volatile data storage, and wherein media interface includes means adapted for accessing data in the data storage. Preferably, the portable data device is selected from a set comprising at least one of universal serial bus data storage, smart card, flash storage device, and disk storage device.

In yet another embodiment of the subject application, the media interface is comprised of a magnetic card reader adapted for receipt of the non-volatile data storage comprised of a magnetic data storage. Preferably, the magnetic card reader is adapted for accessing data from credit cards.

In a further embodiment of the subject application, the system cycle instruction isolation means includes a memory adapted for storing code data representative of at least one preselected code associated with a system cycle instruction. In addition, the system cycle instruction isolation means also includes comparison means adapted for comparing data associated with the portable data device with code data and means adapted for isolating the system cycle instruction in accordance with an output of the comparison means. Preferably, the at least one preselected code is in a predefined format associated with credit cards having magnetic data strips associated therewith.

Still further, in accordance with one embodiment of the subject application, there is provided a method for soft reset of computer devices in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for the controlled shutdown or restart of computer systems. In particular, the subject application is directed to a system and method for the controlled shutdown or restart of computer systems wherein the dominant user interface is a touch screen. It will become apparent to those skilled in the art that the system and method described herein are suitably adapted to a plurality of varying electronic fields employing computer operating systems, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
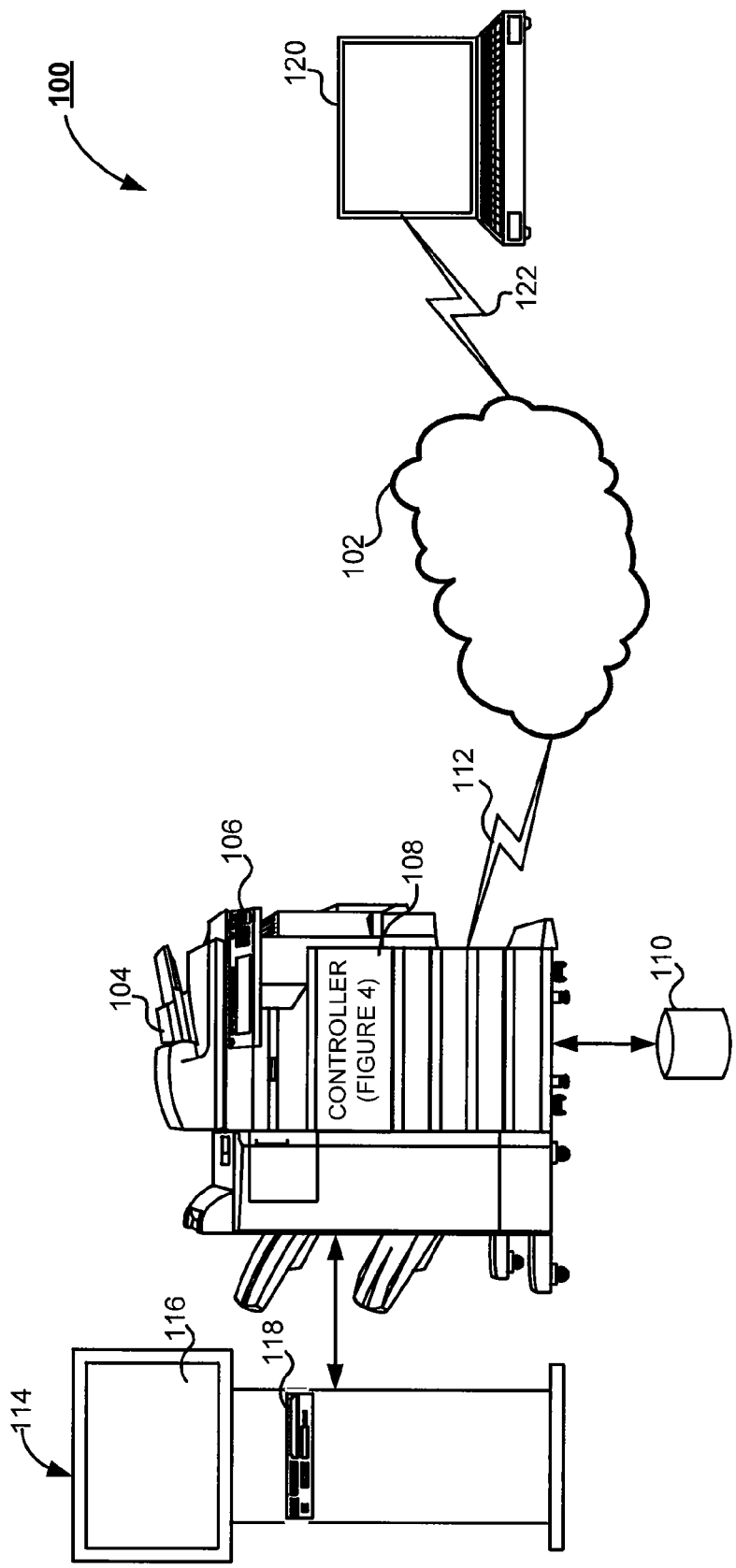
FIG. 1 is an overall diagram of a portable system for soft reset of computer devices according to one embodiment of the subject application.

Referring now to FIG. 1, there is shown an overall diagram of a portable system 100 for soft reset of computer devices in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. The functioning of the document processing device 104 will better be understood in conjunction with the block diagrams illustrated in FIGS. 2 and 3, explained in greater detail below.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and are intended as such when used hereinafter. Furthermore, the use of the controller 108 hereinafter is for the example embodiment only, and other embodiments, which will be apparent to one skilled in the art, are capable of employing the portable system and method for soft reset of computer devices of the subject application. The functioning of the controller 108 will better be understood in conjunction with the block diagrams illustrated in FIGS. 4 and 5, explained in greater detail below.

Communicatively coupled to the document processing device 104 is a data storage device 110. In accordance with the preferred embodiment of the subject application, the data storage device 110 is any mass storage devices known in the art including, for example and without limitation, magnetic storage drives, a hard disk drive, optical storage devices, flash memory devices, or any suitable combination thereof. In the preferred embodiment, the data storage device 110 is suitably adapted to store document data, image data, electronic database data, or the like. It will be appreciated by those skilled in the art that while illustrated in FIG. 1 as being a separate component of the system 100, the data storage device 110 is capable of being implemented as an internal storage component of the associated document processing device 104, a component of the controller 108, or the like, such as, for example and without limitation, an internal hard disk drive, or the like. In accordance with one embodiment of the subject application, the data storage device 110 is capable of storing images, gift card formats, fonts, and the like.

Illustrated in FIG. 1 is a kiosk 114, communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of kiosk. In accordance with one embodiment of the subject application, the kiosk 114 includes a user interface/display 116, hereinafter display 116, and a portable media reader 118. In accordance with on embodiment of the subject application, the display 116 is representative of any touch screen interface known in the art and the use of the display 116 in the document processing context is solely for example purposes. Other uses of the subject application outside the document processing field will be apparent to those skilled in the art including, for example and without limitation, airport check-in kiosks, library kiosks, Internet kiosks, merchant kiosks, or other such touch-screen embodiments.

According to one embodiment of the subject application, the kiosk 114 is suitably adapted to display prompts to an associated user, receive instructions from the associated user, receive payment data, receive selection data from the associated user, and the like. Preferably, the kiosk 114 is suitably adapted to receive a portable data device, such as a magnetic data storage device, universal serial bus storage, smart card, flash storage device, disk storage device, non-volatile storage device, credit card, or the like. Thus, the skilled artisan will appreciate that in accordance with such an embodiment, the portable media reader 118 includes a magnetic card reader, conventional bar code reader, or the like, suitably adapted to receive and read data from a portable data device.

The system 100 illustrated in FIG. 1 further depicts a user device 120, in data communication with the computer network 102 via a communications link 122. It will be appreciated by those skilled in the art that the user device 120 is shown in FIG. 1 as a laptop computer for illustration purposes only. As will be understood by those skilled in the art, the user device 120 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 122 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 120 is suitably adapted to generate and transmit electronic documents, document processing instructions, user interface modifications, upgrades, updates, personalization data, or the like, to the document processing device 104, or any other similar device coupled to the computer network 102. In accordance with one embodiment of the subject application, the user device 120 includes a web browser application, suitably adapted to securely interact with the document processing device 104, or the like. The skilled artisan will appreciate that the user device 120 is also capable of implementation as an administrative device, whereupon a user associated with the device 120 is able to access, delete, view, or otherwise modify data stored on a portable data device for use in association with operations of the document processing device 104.

Figure 2:
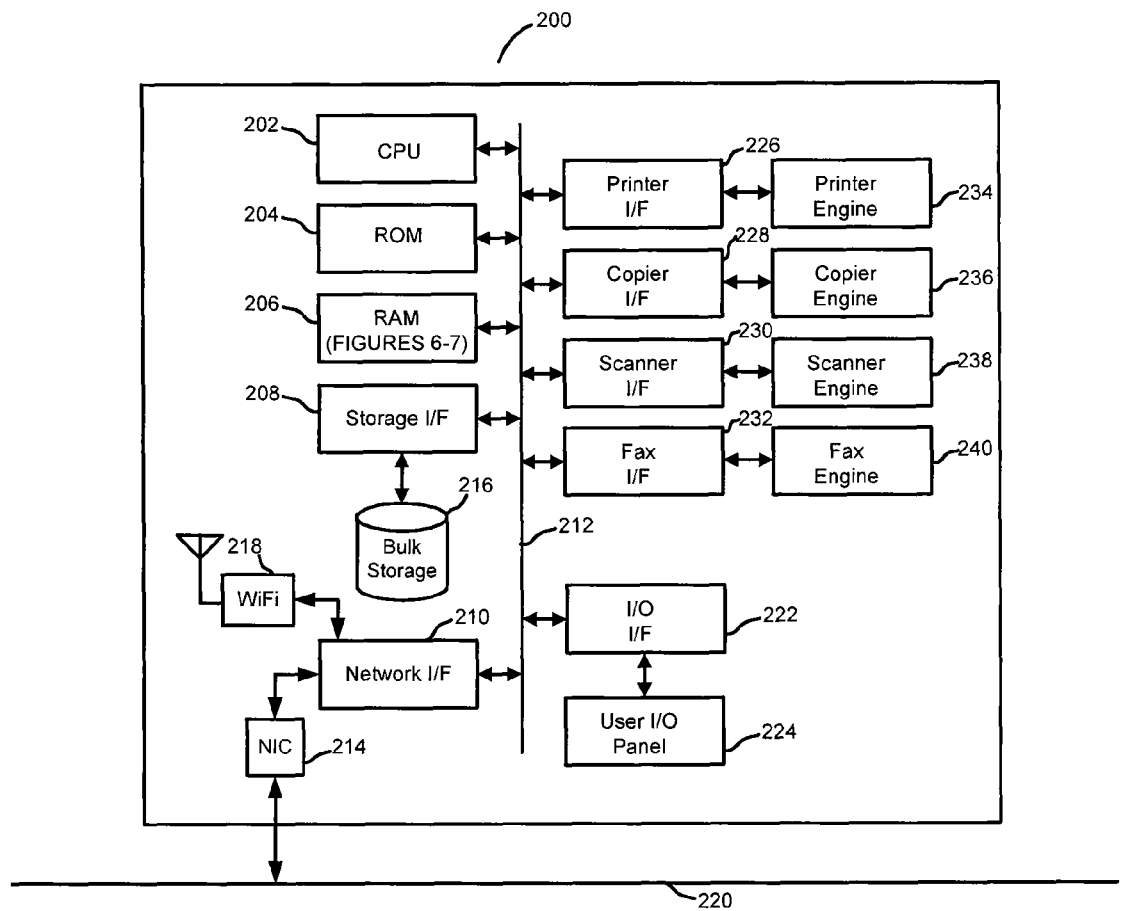
FIG. 2 is a block diagram illustrating device hardware for use in the portable system for soft reset of computer devices according to one embodiment of the subject application.

Turning now to FIG. 2, illustrated is a representative architecture of a suitable device 200, (shown in FIG. 1 as the document processing device 104), on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multi-function devices.

Figure 3:
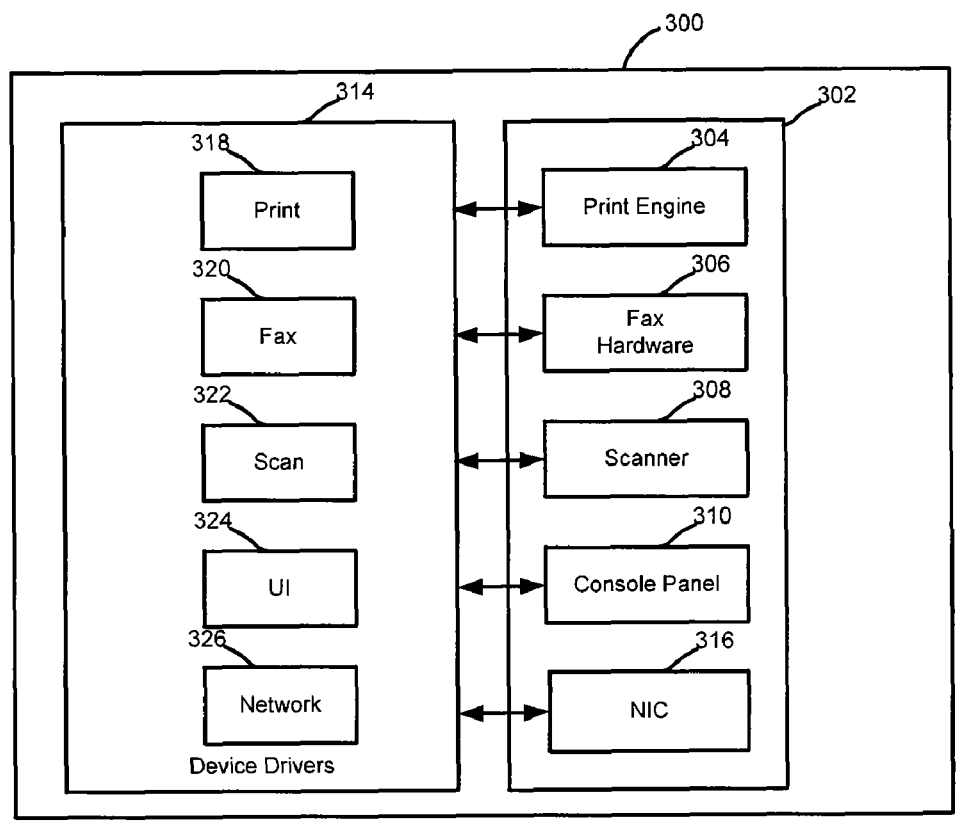
FIG. 3 is a functional diagram illustrating the device for use in the portable system for soft reset of computer devices according to one embodiment of the subject application.

Turning now to FIG. 3, illustrated is a suitable document processing device, (shown in FIG. 1 as the document processing device 104), for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
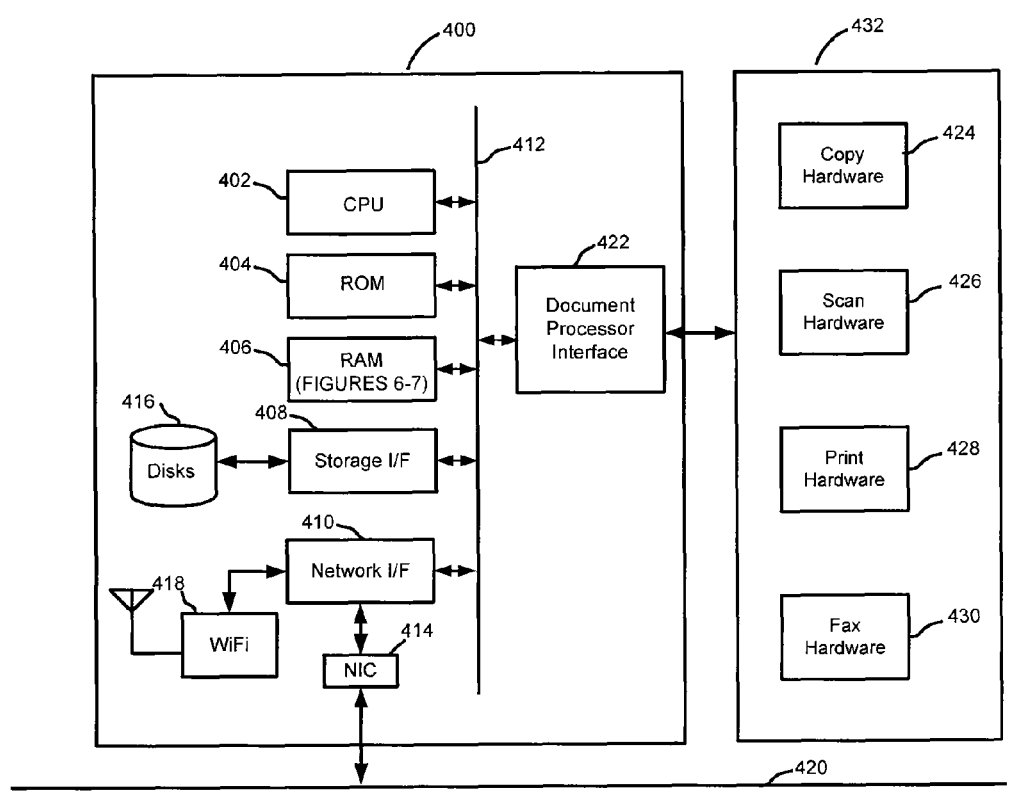
FIG. 4 is a block diagram illustrating controller hardware for use in the portable system for soft reset of computer devices according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 108 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with bus the 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
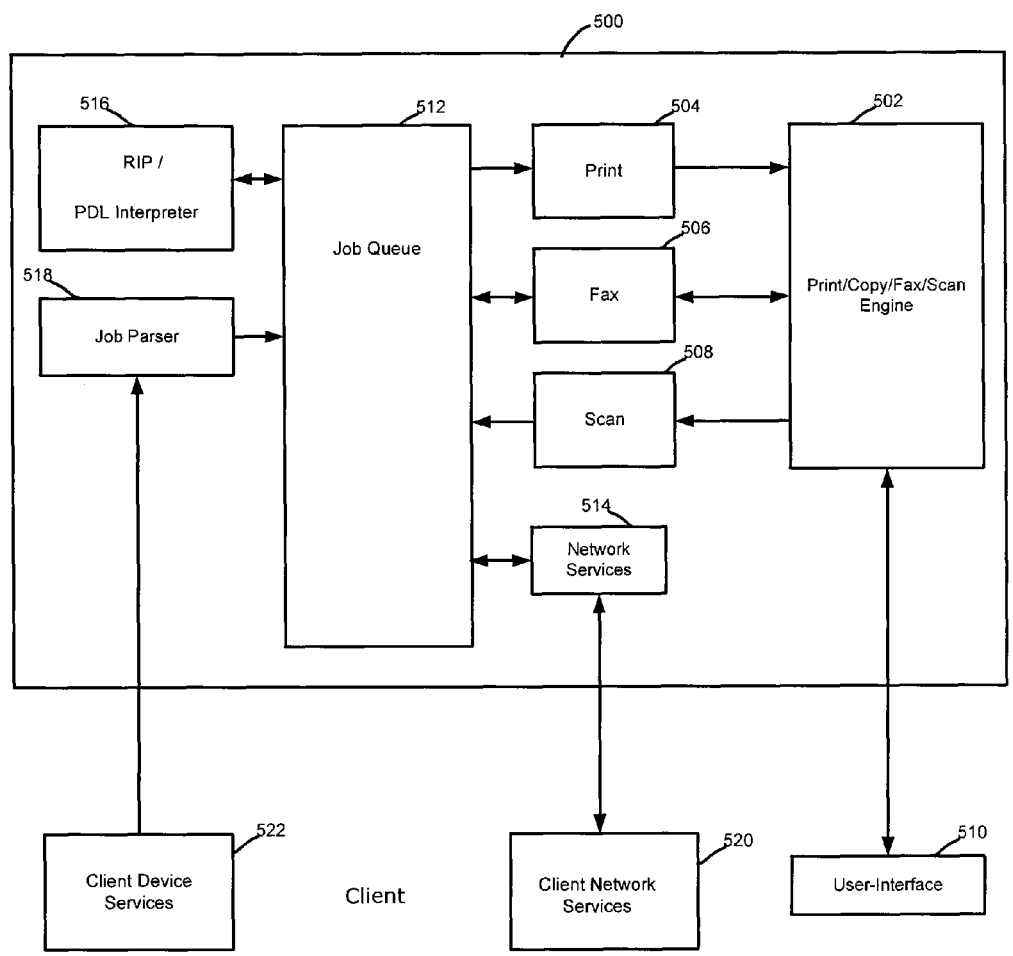
FIG. 5 is a functional diagram illustrating the controller for use in the portable system for soft reset of computer devices according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

In operation, the presence of a portable data device is first detected via an associated media interface. Data communication is then commenced between a computer device and the detected portable data device via the media interface. A system cycle instruction is then isolated according to the data communication between the computer device and the detected data device. A system cycle is then commenced with respect to the computer device, in accordance with the isolated system cycle instruction.

In accordance with one example embodiment of the subject application, a computer device, such as the kiosk 114, the controller 108 associated with the document processing device 104 and in data communication with the kiosk, the user device 120, or the like, receives a preselected code corresponding to an associated system cycle instruction. For purposes of this example embodiment, reference is made hereinafter to the kiosk 114 as the computer device. In such an embodiment, the kiosk 114 is capable of using the resources of the document processing device 104, e.g., the controller 108, the data storage device 110, the user interface 106, or the like, during normal operations. It will be appreciated by those skilled in the art that the preselected code is capable of including any machine-readable data known in the art, such as, for example and without limitation, a text string, an alphanumeric string, a string of digits, e.g., a 16-digit number, or any suitable combination thereof capable of being read via electronic means.

The code and associated system cycle instruction is then stored in the memory associated with the kiosk 114, e.g., the data storage device 110. In accordance with one embodiment of the subject application, the system cycle instruction is capable of including, for example and without limitation, a hard shutdown, a soft shutdown, a restart, an application shutdown, or the like. Following the storage of the preselected code and corresponding system cycle instruction, the kiosk 114 is ready to commence normal operations. Thus, when associated with a document processing device 104, as illustrated in FIG. 1, the kiosk 114 is ready to receive and process document processing operations corresponding to user requests. When associated with airport ticketing, the kiosk 114 is ready to commence ticketing operations. Other such operations will commence in accordance with the environment in which the kiosk is thus implemented, as will be understood by those skilled in the art.

When a portable data device is detected by the kiosk 114, e.g., a universal serial bus device, flash memory card, smart card, magnetic strip card (credit card), or other storage media via the media interface 118, the portable data device is accessed by the kiosk 114 and data associated therewith is retrieved. The kiosk 114 then retrieves the preselected code from the associated memory, e.g., the data storage device 110, system memory, or the like. The data retrieved from the portable data device is then compared to the retrieved code. When no match between the two is detected, the kiosk 114 returns to normal operations. For example, when the accessed data corresponds to one or more electronic documents for output by the document processing device 104, the code will not match the portable data device data and operations return to normal.

When the codes match, the kiosk 114 isolates the system cycle instruction corresponding to the matched code. In the event that the system cycle instruction corresponds to a hard shutdown command, the kiosk 114 executes the instruction resulting in the hard shutdown of the kiosk 114, e.g., turns the kiosk 114 off until reactivated by a user. When the system cycle instruction isolated by the kiosk 114 corresponds to a soft shutdown/system restart command, the kiosk 114 performs a soft shutdown and restarts. Upon restart, the kiosk 114 commences normal operations in accordance with the environment in which it is implemented. For example, during normal operations of the kiosk 114, an unexpected error is capable of occurring resulting in the non-responsiveness of the kiosk 114, e.g., an application error, hardware error, or the like. In such an event, an administrative user is notified by the user of the kiosk 114, or via communications from the kiosk 114 of the error and swipes a magnetic card (credit card) having an account number or code stored thereon. The kiosk 114 then retrieves code from associated memory, e.g., the data storage device 110, and compares the code from the credit card with the code in memory. In the event of a match, the system cycle instructions associated with the code in memory are executed, whereupon the kiosk 114 performs a soft shutdown and restarts. Thereafter, the kiosk 114/document processing device 104 combination is ready to perform requested document processing operations.

Figure 6:
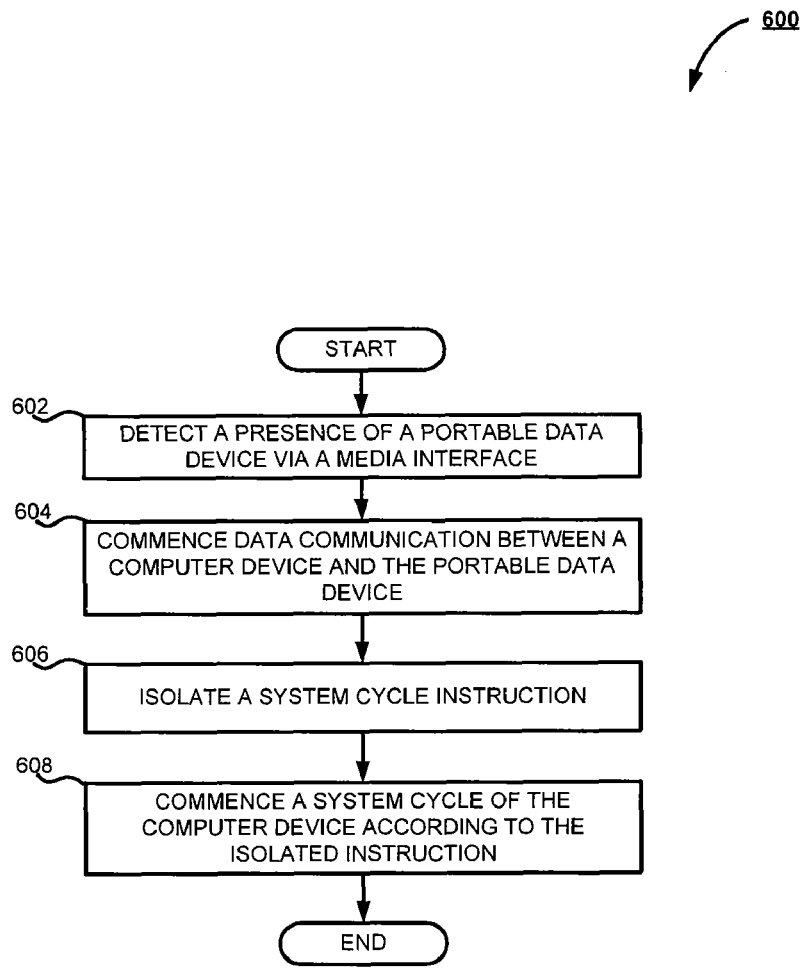
FIG. 6 is a flowchart illustrating a portable method for soft reset of computer devices according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6 and FIG. 7. Turning now to FIG. 6, there is shown a flowchart 600 illustrating a portable method for soft reset of computer devices in accordance with one embodiment of the subject application. Beginning at step 602, a presence of a portable data device is detected via an associated media interface, e.g., the media interface 118 associated with the kiosk 114. It will be appreciated by those skilled in the art that the kiosk 114 is representative of a computer device in accordance with one embodiment of the subject application. According to one embodiment of the subject application, the portable data device includes non-volatile data storage and the media interface 118 is configured to access the data stored in the non-volatile data storage. Suitable examples of such non-volatile data storage include, without limitation, magnetic data storage, credit cards, universal serial bus data storage, flash storage device, disk storage, smart card, or the like.

Thereafter, at step 604, data communication between the portable data device and a computer device, e.g., the kiosk 114, is commenced via the media interface 118. For example, when the portable data device is a credit card, a swipe of the credit card via a credit card reader associated with the media interface 118, results in the accessing of the data stored on the magnetic strip of the credit card. A system cycle instruction is then isolated at step 606 in accordance with the data communication between the kiosk 114 and the detected portable data device. At step 608, a system cycle of the kiosk 114 is commenced in accordance with the isolated system cycle instruction.

Figure 7:
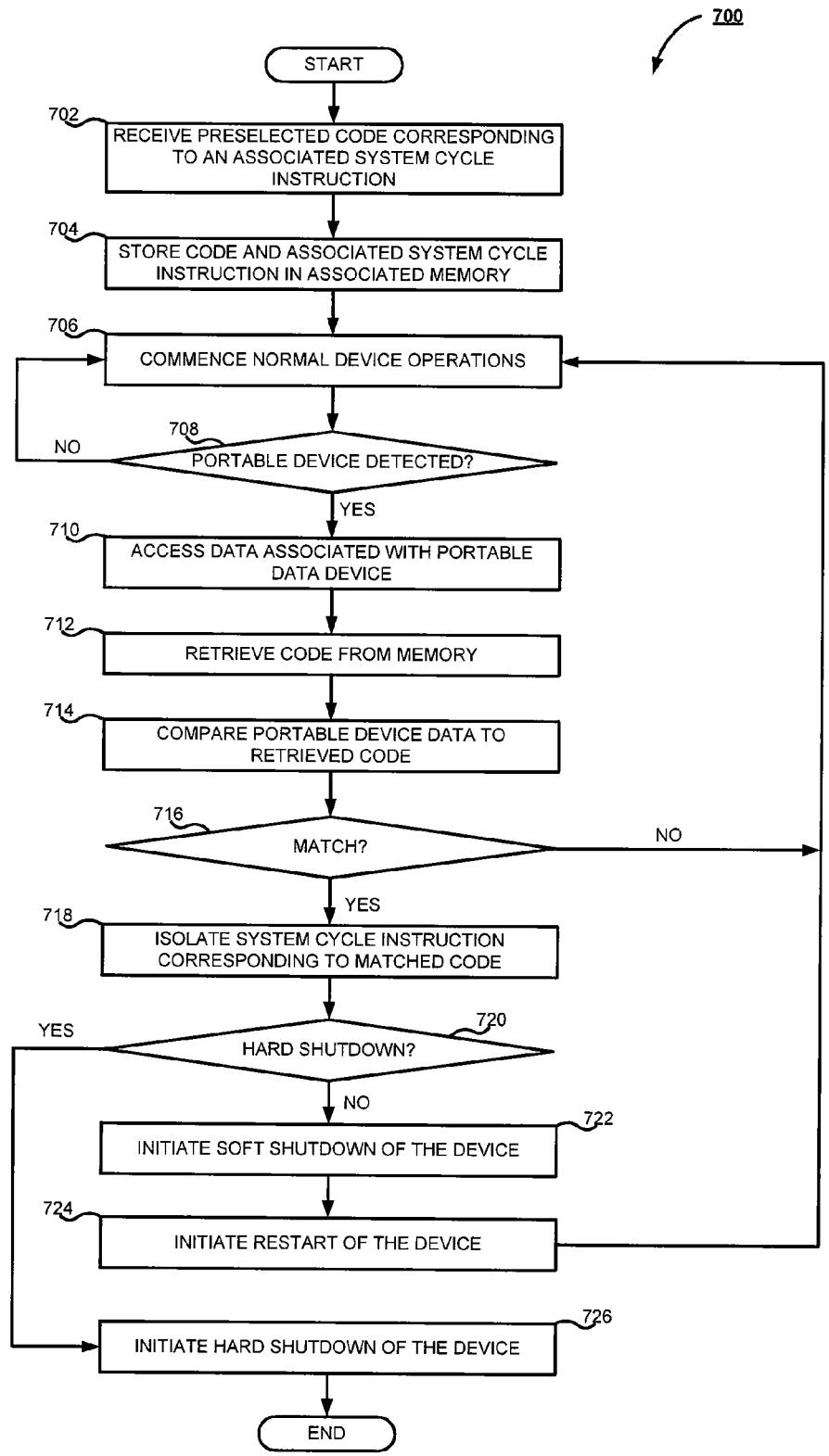
FIG. 7 is a flowchart illustrating a portable method for soft reset of computer devices according to one embodiment of the subject application.

Referring now to FIG. 7, there is shown a flowchart 700 illustrating a portable method for soft reset of computer devices in accordance with one embodiment of the subject application. The methodology depicted in FIG. 7 begins at step 702, whereupon a preselected code corresponding to an associated system cycle instruction is received by the kiosk 114. It will be appreciated by those skilled in the art that such a preselected code is capable of being received by the kiosk 114 from a user associated with the kiosk 114, the document processing device 104, the user device 120, or the like. As will be understood by those skilled in the art, the system cycle instruction corresponds to an operative command to be executed by the kiosk 114 upon receipt of the preselected code. Suitable examples of such instructions includes, without limitation, hard shutdown, soft shutdown, restart, application termination, or the like.

At step 704, the preselected code and associated system cycle instruction is then stored in associated memory. As illustrated in FIG. 1, which corresponds to a document processing implementation of the subject application, the kiosk 114 is capable of facilitating the storage of the preselected code and corresponding system cycle instruction on the data storage device 110 associated with the document processing device 104 with which the kiosk 114 is in data communication. At step 706 the kiosk 114 commences normal operations. That is, within the document processing context, the kiosk 114 is ready to accept user interactions regarding operations of the associated document processing device 104.

A determination is then made at step 708 whether a portable data device has been detected. That is, whether a user has inserted a portable data device in the media interface 118, swiped a suitable magnetic card (credit card), smart card, or the like. When no portable data device is detected, flow returns to step 706 and normal operations continue. Upon a determination at step 708 that a portable data device has been detected, flow proceeds to step 710, whereupon data associated with the portable data device is accessed by the kiosk 114. Following access to the data of the portable data device, the kiosk 114 retrieves the preselected code or codes from the data storage device 110, system memory, or the like at step 712. The data retrieved from the portable data device is then compared at step 714 to the retrieved codes.

A determination is then made at step 716 whether the accessed data from the portable device matches a preselected code retrieved from memory. When no match is detected, operations return to step 706, with normal document processing commencing. For example, the data accessed from the portable data device corresponds to user identification data, billing information, electronic documents, or the like, results in the return to normal document processing operations at step 706. When a match is detected at step 716, flow proceeds to step 718, whereupon a system cycle instruction corresponding to the matched preselected code is isolated by the kiosk 114. A determination is then made at step 720 whether the system cycle instruction corresponds to a hard shutdown command. When a hard shutdown command is isolated, flow proceeds to step 726 with the hard shutdown of the kiosk 114. Thereafter operations with respect to FIG. 7 terminate.

A determination at step 720 that the isolated system cycle instruction does not correspond to a hard shutdown of the kiosk 114 prompts the initiation of a soft shutdown of the kiosk 114 at step 722. Following the soft shutdown of the kiosk 114 at step 722, flow proceeds to step 724, whereupon a restart of the kiosk 114 is initiated. Thereafter, flow returns to step 706 upon restart of the kiosk 114 and normal operations of the kiosk 114/document processing device 104 continue.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A computer device comprising:
   memory for storing a preselected code associated with a system power down instruction;
   a media interface including,
   means for detecting a presence of a portable data device, the portable data device including non-volatile data storage storing code data representative of the preselected code associated with a system power down instruction, and
   means for commencing data communication between the computer device and the portable data device; system power down instruction isolation means for isolating a system power down instruction in accordance with data communication between the computer device and the portable data device, the system power down instruction isolation means including,
   comparison means for comparing the preselected code with the code data, and means for isolating the system power down instruction in accordance with an output of the comparison means; and
   means adapted for commencing a system power down of the computer device in accordance with the system power down instruction;
   wherein the system power down instruction includes a restart instruction initiating a restart of the computer device after a soft shutdown.

2. The computer device system of claim 1 wherein the media interface includes means for accessing data in the non-volatile data storage.

3. The computer device of claim 2 wherein the media interface is comprised of a magnetic card reader adapted for receipt of the non-volatile data storage comprised of a magnetic data storage.

4. The computer device of claim 3 wherein the magnetic card reader is for accessing data from credit cards.

5. The computer device of claim 4 wherein the at least one preselected code is in a predefined format associated with credit cards having magnetic data strips associated therewith.

6. The computer of claim 2 wherein the portable data device is selected from a set comprising at least one of universal serial bus data storage, smart card, flash storage device, and disk storage device.

7. A method for soft reset of computer devices comprising:
   storing a preselected code associated with a system power down instruction;
   detecting a presence of a portable data device via an associated media interface the portable data device including non-volatile data storage storing code data representative of a the preselected code associated with a system power down instruction;
   commencing data communication between a computer device and the portable data device via the media interface;
   isolating the system power down instruction in accordance with data communication between the computer device and the detected portable data device by comparing the preselected code with the code data; and
   commencing a system power down of the computer device in accordance with the system power down instruction;
   wherein the system power down instruction includes a restart instruction initiating a restart of the computer device after a soft shutdown.

8. The method of claim 7 further comprising accessing data in the data storage.

9. The method of claim 8 wherein detecting the presence of the portable data device and commencing data communication between the computer device and the portable data device utilize a magnetic card reader including magnetic data storage.

10. The method of claim 9 further comprising the step of for accessing data from credit cards via the magnetic card reader.

11. The method of claim 10 wherein the at least one preselected code is in a predefined format associated with credit cards having magnetic data strips associated therewith.

12. The method of claim 8 wherein the portable data device is selected from a set comprising at least one of universal serial bus data storage, smart card, flash storage device, and disk storage device.

13. A computer device comprising:
   a media interface comprised of a magnetic card reader adapted for accessing data from non-volatile data storage in the form of credit cards, the media interface comprising,
   means adapted for detecting a presence of a portable data device including a non-volatile data storage, and
   means adapted for accessing data in the non-volatile data storage, means adapted for commencing data communication between the computer device and the portable data device; system cycle instruction isolation means adapted for isolating a system cycle instruction in accordance with data communication between the computer device and the portable data device, the system cycle instruction isolation means comprising,
   a memory adapted for storing a preselected code associated with the system cycle instruction,
   comparison means adapted for comparing data associated with the preselected code with the code data, and means adapted for isolating the system cycle instruction in accordance with an output of the comparison means; and means adapted for commencing a system cycle of the computer device in accordance with the system cycle instruction, the system cycle instruction including a power down instruction initiating a soft shutdown of the computer device and a restart instruction so as to initiate a restart of the computer device after the soft shutdown.

14. A portable method for soft reset of computer devices comprising the steps of:

detecting a presence of a portable data device including non-volatile storage via an associated media interface including a magnetic card reader adapted for accessing data from non-volatile data storage in the form of credit cards;

accessing data in the non-volatile data storage;

commencing data communication between a computer device and the portable data device via the media interface;

isolating a system cycle instruction in accordance with data communication between the computer device and the portable data device, the isolating a system cycle instruction comprising, storing code data representative of a preselected code associated with a system cycle instruction in an associated memory, comparing code data associated with the portable data device with the preselected code;

isolating the system cycle instruction in accordance with a comparison of the preselected code with the code data; and commencing a system cycle of the computer device in accordance with the system cycle instruction including a power down instruction initiating a soft shutdown of the computer device and a restart instruction so as to initiate restart of the computer device after the soft shutdown.

\* \* \* \* \*